(12) United States Patent
Fukui

(10) Patent No.: US 11,959,525 B2
(45) Date of Patent: Apr. 16, 2024

(54) DAMPING MATERIAL

(71) Applicant: KOTOBUKIYA FRONTE CO., LTD., Tokyo (JP)

(72) Inventor: Kazuki Fukui, Saitama (JP)

(73) Assignee: KOTOBUKIYA FRONTE CO., LTD. (JP)

( * ) Notice: Subject to any disclaimer, the term of this patent is extended or adjusted under 35 U.S.C. 154(b) by 597 days.

(21) Appl. No.: 17/271,654

(22) PCT Filed: Jan. 24, 2019

(86) PCT No.: PCT/JP2019/002329
§ 371 (c)(1),
(2) Date: Feb. 26, 2021

(87) PCT Pub. No.: WO2020/136920
PCT Pub. Date: Jul. 2, 2020

(65) Prior Publication Data
US 2021/0341028 A1    Nov. 4, 2021

(30) Foreign Application Priority Data
Dec. 25, 2018 (JP) ................. 2018-241305

(51) Int. Cl.
*F16F 1/36* (2006.01)
*B32B 3/26* (2006.01)
(Continued)

(52) U.S. Cl.
CPC ............... *F16F 1/36* (2013.01); *B32B 3/266* (2013.01); *B32B 5/02* (2013.01); *B32B 15/085* (2013.01);
(Continued)

(58) Field of Classification Search
CPC .. F16F 1/36; F16F 2224/02; F16F 2224/0208; F16F 2228/007; F16F 9/306;
(Continued)

(56) References Cited

U.S. PATENT DOCUMENTS

| 3,087,571 | A |   | 4/1963 | Kerwin |
| 4,565,940 | A | * | 1/1986 | Hubbard, Jr. ......... F16F 15/005 |
|   |   |   |   | 310/317 |

(Continued)

FOREIGN PATENT DOCUMENTS

| EP | 1955899 A1 | 8/2008 |
| JP | S6389759 A | 4/1988 |

(Continued)

OTHER PUBLICATIONS

Supplementary European Search Report for EP19903661 dated Jan. 25, 2022, 2 pgs.

(Continued)

*Primary Examiner* — Robert A. Siconolfi
*Assistant Examiner* — James K Hsiao
(74) *Attorney, Agent, or Firm* — Lerner David LLP

(57) ABSTRACT

There is provided a vibration damping material capable of exhibiting excellent vibration damping performance and of reducing its own weight while having high rigidity. The vibration damping material of the present invention used so as to be installed on a panel of a vehicle includes a viscoelastic layer and a constraining layer provided on one surface of the viscoelastic layer, wherein a relationship between a strain $\varepsilon a$ and a strain $\varepsilon b$ is $0<\varepsilon a/\varepsilon b<1$, the strain $\varepsilon a$ being a strain on a surface of the constraining layer on the opposite side to the viscoelastic layer, and the strain $\varepsilon b$ being a strain on a surface of the constraining layer on a side in contact with the viscoelastic layer.

8 Claims, 8 Drawing Sheets

(51) Int. Cl.
*B32B 5/02* (2006.01)
*B32B 15/085* (2006.01)
*B32B 15/18* (2006.01)
*B32B 15/20* (2006.01)
*B32B 27/12* (2006.01)
*F16F 9/30* (2006.01)

(52) U.S. Cl.
CPC .............. *B32B 15/18* (2013.01); *B32B 15/20* (2013.01); *B32B 27/12* (2013.01); *B32B 2262/106* (2013.01); *B32B 2307/56* (2013.01); *B32B 2605/00* (2013.01); *F16F 2224/02* (2013.01); *F16F 2224/0208* (2013.01)

(58) Field of Classification Search
CPC ......... B32B 3/266; B32B 5/02; B32B 15/085; B32B 15/18; B32B 15/20; B32B 27/12; B32B 2262/106; B32B 2307/56; B32B 2605/00; B60R 13/0815
See application file for complete search history.

(56) References Cited

U.S. PATENT DOCUMENTS

| | | | |
|---|---|---|---|
| 6,102,379 A * | 8/2000 | Ponslet | F16F 9/30 |
| | | | 208/279 |
| 6,298,963 B1 | 10/2001 | Kim | |
| 7,199,970 B2 * | 4/2007 | Boss | G11B 25/043 |
| 7,685,922 B1 * | 3/2010 | Martin | F41H 5/0428 |
| | | | 89/36.01 |
| 7,992,296 B2 * | 8/2011 | Kim | H05K 3/4661 |
| | | | 29/830 |
| 9,387,649 B2 * | 7/2016 | Tinianov | E04C 2/043 |
| 2004/0253453 A1 | 12/2004 | Myers et al. | |
| 2005/0094311 A1 * | 5/2005 | Boss | G11B 33/08 |
| 2007/0215195 A1 * | 9/2007 | Buller | H01L 31/035281 |
| | | | 257/E31.038 |
| 2008/0128202 A1 * | 6/2008 | Palumbo | B32B 3/12 |
| | | | 428/116 |
| 2008/0176027 A1 * | 7/2008 | Pflug | B31D 3/005 |
| | | | 428/116 |
| 2008/0248274 A1 * | 10/2008 | Hierholz | F16F 9/306 |
| | | | 428/411.1 |
| 2010/0013255 A1 | 1/2010 | Mantovani et al. | |
| 2017/0253005 A1 | 9/2017 | Matsumoto | |
| 2018/0156296 A1 * | 6/2018 | Alexander | B60R 13/0815 |
| 2018/0257196 A1 * | 9/2018 | Simpson | B24C 1/04 |
| 2018/0345621 A1 | 12/2018 | Matsumoto et al. | |

FOREIGN PATENT DOCUMENTS

| | | |
|---|---|---|
| JP | S6394837 A | 4/1988 |
| JP | H02297434 A | 12/1990 |
| JP | H06010488 U | 2/1994 |
| JP | H07317837 A | 12/1995 |
| JP | 2003336687 A | 11/2003 |
| JP | 2008520456 A | 6/2008 |
| JP | 2008194887 A | 8/2008 |
| JP | 2010517864 A | 5/2010 |
| JP | 201282949 A | 4/2012 |
| JP | 2012162062 A | 8/2012 |
| JP | 2015194255 A | 11/2015 |
| JP | 2018521275 A | 8/2018 |
| WO | 03100289 A1 | 12/2003 |
| WO | 2006053407 A1 | 5/2006 |
| WO | 2008098395 A2 | 8/2008 |
| WO | 2015147078 A1 | 10/2015 |
| WO | 2016031479 A1 | 3/2016 |
| WO | 2016181745 A1 | 11/2016 |
| WO | 2016205357 A1 | 12/2016 |
| WO | 2017038459 A1 | 3/2017 |

OTHER PUBLICATIONS

"Handbook of Damping Technology", edited by Seishin Kogaku Handobukku Hensyu linkai, The Editorial Committee on Handbook of Damping Technology, Corona Publishing Co., Ltd., May 13, 2008, pp. 84-86.
International Search Report for Application No. PCT/JP2019/002329 dated Mar. 26, 2019, 2 pgs.

* cited by examiner

DAMPING MATERIAL

CROSS-REFERENCE TO RELATED APPLICATIONS

The present application is a national phase entry under 35 U.S.C. § 371 of International Application No. PCT/JP2019/002329 filed Jan. 24, 2019, published in Japanese, which claims priority from Japanese Patent Application No. 2018-241305 filed Dec. 25, 2018, all of which are incorporated herein by reference.

TECHNICAL FIELD

The present invention relates to a vibration damping material, and more particularly, relates to a vibration damping material for vehicles.

BACKGROUND ART

Metal plates such as thin steel plates and aluminum plates are generally used as structural members in vehicles, electric appliances and the like. In order to reduce the vibration of a vehicle or electric appliance, it is possible to adhere a viscoelastic material on a surface of the metal plate to impart vibration attenuation performance (vibration damping performance) to a structural member. Such vibration damping structures are roughly classified into two types: a structure called a non-constraint type in which a viscoelastic material is simply adhered to one surface or both surfaces of a metal plate, and a structure called a "constraint type" in which a constraining plate such as a metal plate or a high polymeric material is further adhered to the surface of the viscoelastic material on the opposite side of the metal plate (Non-Patent Document 1).

In addition, as a constraint type vibration damping structure using a constraining plate made of a polymeric material, Patent Document 1 discloses a carbon fiber reinforced plastic molded body, including: a first carbon fiber reinforced plastic layer; a second carbon fiber reinforced plastic layer laminated on one surface of the first carbon fiber reinforced plastic layer; and a first vibration damping layer arranged between the first carbon fiber reinforced plastic layer and the second carbon fiber reinforced plastic layer, wherein: the thickness of the second carbon fiber reinforced plastic layer is thinner than the thickness of the first carbon fiber reinforced plastic layer; and the first vibration damping layer is provided with gaps extending in a direction intersecting the orientation direction of the carbon fibers contained in the second carbon fiber reinforced plastic layer. Patent Document 1 describes that: with this configuration such that the first carbon fiber reinforced plastic is made relatively thick and the second carbon fiber reinforced plastic layer is made relatively thin, the first vibration damping layer is arranged on the outer surface side with respect to the center of the carbon fiber reinforced plastic molded body; this prevents decrease in flexural modulus of the carbon fiber reinforced plastic molded body; furthermore, since the predetermined gaps are provided, the gaps relieve the stress caused by the expansion of the carbon fiber reinforced plastic layer and the contraction of the vibration damping layer; and as a result, even if the second carbon fiber reinforced plastic layer is configured to be thin, the surface of the second carbon fiber reinforced plastic layer is prevented from deformation generated when the carbon fiber reinforced plastic molded body is molded.

A typical structure of a vehicle has an engine compartment provided at the front, a trunk compartment provided at the rear, and a passenger compartment provided in the middle thereof. The passenger compartment is provided with seats such as a driver seat, a front passenger seat, and a rear seat. In addition, the passenger compartment has a dash insulator, a floor carpet, a floor spacer, a trunk trim, and a trunk floor installed so that they cover the outside of the vehicle interior. These components are formed in an uneven shape according to shapes of vehicle bodies or designs of components. Furthermore, the exterior under a vehicle body has a front fender liner, a rear fender liner, and an undercover that is formed in an uneven shape for controlling the air flow, installed thereon. For many of these components, a thermoplastic resin is used as a material, and each of the materials is heated and press-molded by a die having the shape of the component to be finished into an uneven-shaped component having a plurality of portions with different thicknesses.

As a recent trend of vehicle development, the quietness in the interior of a vehicle is emphasized. Noise transmitted to the interior of a vehicle includes noise from the windows, noise from the tires, noise from under the vehicle body, noise from engine sounds, and noise from motor sounds. Noise generated from a vehicle is transmitted to the vehicle interior via the vibration of air or via the vibration of an object. The noise transmitted mainly via the vibration of an object is blocked by the vibration damping structure described above. Accordingly, it is possible to exhibit sufficient acoustic performance against the noise generated in the vehicle. On the other hand, it is also important to reduce fuel consumption, and it is also required to reduce weight of interior and exterior components of vehicles.

REFERENCE DOCUMENT LIST

Patent Document

Patent Document 1: JP 2012-162062 A

Non-Patent Document

Non-Patent Document 1: "Handbook of Damping Technology", edited by Seishin Kogaku Handobukku Hensyu Iinkai, The Editorial Committee on Handbook of Damping Technology, Corona Publishing Co., Ltd., May 13, 2008, pp. 84-86

SUMMARY OF THE INVENTION

Problem to be Solved by the Invention

As described in Non-Patent Document 1, in non-constraint type vibration damping structure, the thicker the viscoelastic material, the higher the vibration damping performance Therefore, in order to obtain desired vibration damping performance, a problem is that the thickness of the viscoelastic material is too large to be practical. On the other hand, in a constraint type vibration damping structure, the vibration damping performance is maximized when the metal plate used as the constraining plate and the metal plate of the substrate have the same thickness. Therefore, in order to obtain desired vibration damping performance, another problem is that the weight of the constraining plate is large even though the rigidity is high, but weight reduction is difficult. In addition, when the carbon fiber reinforced plastic molded body described in Patent Document 1 is installed on a vehicle panel to be used for vibration damping of the panel, the molded body further need to be provided with a vibration damping layer (viscoelastic layer) also between the carbon fiber reinforced plastic molded body and the panel. Therefore, a plurality of carbon fiber reinforced plastic (CFRP) layers and a plurality of viscoelastic layers are laminated on the panel, and there also is a problem of difficulty in weight reduction.

Therefore, an object of the present invention is to provide a vibration damping material capable of exhibiting excellent vibration damping performance and reducing its own weight.

Means for Solving the Problem

In order to achieve the object, the present invention provides a vibration damping material, including a viscoelastic layer and a constraining layer provided on one surface of the viscoelastic layer, wherein a relationship between a strain $\varepsilon a$ and a strain $\varepsilon b$ is $0<\varepsilon a/\varepsilon b<1$, the strain $\varepsilon a$ being a strain on a surface of the constraining layer on the opposite side to the viscoelastic layer, and the strain $\varepsilon b$ being a strain on a surface of the constraining layer on a side in contact with the viscoelastic layer.

The constraining layer may have a multilayer structure including at least a core layer in which tubular cells are arranged in a plurality of rows. The tubular cell may have a polygonal tubular shape such as a substantially quadrangular tubular shape or a substantially hexagonal tubular shape, or may have a curved tubular shape such as a substantially circular tubular shape or a substantially elliptical tubular shape. It is preferable that each of the cells in the core layer have a closed surface at one end and an open end at another end; the open ends of the cells each allow an internal space of the cell to be in communication with an outside; and the open ends of the cells be arranged on both sides of the core layer such that rows of the open ends of the cells are in every other row. The open end, the one-side closed surface, and the other-side closed surface may have a polygonal shape such as a substantially quadrangular shape or a substantially hexagonal shape, or may have a curved shape such as a substantially circular shape or a substantially elliptical shape, according to the shape of the cell. The constraining layer may further include film layers provided on both sides of the core layer. Each of the film layers may have a plurality of apertures penetrating the film layer.

The viscoelastic layer may have a thickness of 0.5 to 2 mm. The constraining layer may be formed to match a panel shape so that a thickness of the viscoelastic layer is uniform. That is, the constraining layer is not limited to a flat shape, and may have a shape such as a curved shape or a corrugated shape corresponding to the shape of the panel. The relationship between the strain $\varepsilon a$ and the strain $\varepsilon b$ is preferably $0.2<\varepsilon a/\varepsilon b<0.7$.

The viscoelastic layer may be partially provided on a surface of the constraining layer on the side in contact with the viscoelastic layer. In addition, the constraining layer may have a multilayer structure including a fiber layer on the constraining layer on the side in contact with the viscoelastic layer. The constraining layer may have a multilayer structure including a metal layer on the constraining layer on a side opposite to the side in contact with the viscoelastic layer.

Effects of the Invention

The vibration damping material of the present invention has a configuration such that the strain ratio $\varepsilon a/\varepsilon b$ satisfies the expression $0<\varepsilon a/\varepsilon b<1$, where: the strain $\varepsilon a$ is the strain on the surface of the constraining layer, which is provided on the viscoelastic layer, on the opposite side of the viscoelastic layer; and the strain $\varepsilon b$ is the strain on the surface thereof on the side in contact with the viscoelastic layer. This moves the bending central axis of the constraining layer in the direction opposite to the viscoelastic layer with respect to the center position of the thickness of the constraining layer. This configuration allows the vibration damping material to improve in the vibration damping performance Therefore, the constraining layer configured with a resin material, instead of a thick metal plate, can exhibit excellent vibration damping performance, and can reduce its own weight while having high rigidity.

In particular, a configuration, such as one in which the constraining layer has a multilayer structure including at least a core layer in which tubular cells are arranged in a plurality of rows, can exhibit excellent vibration damping performance, and enables weight reduction while having high rigidity.

MODE FOR CARRYING OUT THE INVENTION

An embodiment of a vibration damping material according to the present invention is described below with reference to the accompanying drawings. Note that, although respective embodiments describe cases in each of which a vibration damping material is used for a vehicle, the present invention is not limited to these, and can be used for electric appliances and the like. In addition, the drawings are not intended to be drawn to scale unless otherwise specified.

First Embodiment

Figure 1A:
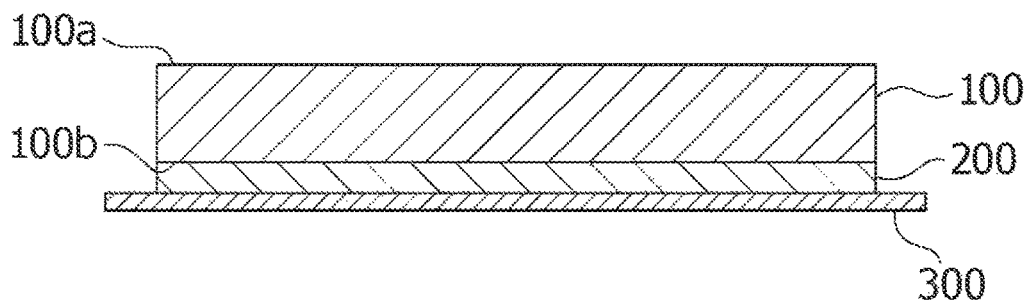
FIG. 1A is a cross-sectional view showing an embodiment of a vibration damping material according to the present invention.

As shown in FIG. 1A, a vibration damping material of a first embodiment includes a constraining layer 100 and a viscoelastic layer 200 provided on one surface thereof. Note that the vibration damping material of the present invention is used so that the viscoelastic layer 200 side is located on a noise source side, that is, the vibration damping material of the present invention is provided on the vehicle interior side such that the viscoelastic layer 200 is installed on the side of a panel 300 of the vehicle body.

Figure 1B:
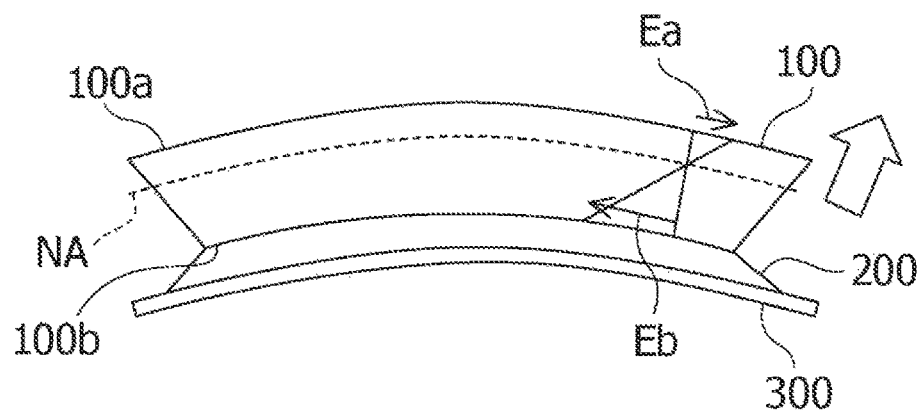
FIG. 1B is a schematic view showing a position of a bending neutral axis when the vibration damping material is bent.

In the constraining layer 100, a ratio $\varepsilon a/\varepsilon b$ satisfies an expression $0<\varepsilon a/\varepsilon b<1$, where: $\varepsilon a$ is the strain of a surface 100a on the side opposite to the viscoelastic layer 200; and $\varepsilon b$ is the strain of a surface 100b on the side in contact with the viscoelastic layer 200. The configuration, such that the constraining layer 100 has a strain ratio $\varepsilon a/\varepsilon b$ that satisfies the expression, moves the bending central axis NA of the constraining layer 100 in the direction opposite to the viscoelastic layer 200 with respect to the center position of the thickness of the constraining layer 100, as shown in FIG. 1B, when the vibration damping material installed on the panel 300 is bent (that is, when subjected to vibration). This allows the vibration damping material to have improved vibration damping performance.

The constraining layer 100 is not particularly limited if the strain ratio $\varepsilon a/\varepsilon b$ satisfies the expression, but may be, for example, a multilayered structure having two or more layers. For each layer of the multilayered structure, for example, a material such as a metal material, a synthetic resin material, or a fiber-reinforced resin material may be used, or these materials may be configured to be, for example, a solid film layer, a hollow core layer, a nonwoven fabric layer, and/or a foam layer. All layers may be made of the same material or different materials. In addition, all the layers may have the same configuration or different configurations. For example, the constraining layer 100 can have different material in each layer, and different configuration and/or thickness in each layer, and can be surface-treated to allow the strain ratio $\varepsilon a/\varepsilon b$ to satisfy the expression. The lower limit of $\varepsilon a/\varepsilon b$ is preferably 0.1 or more, more preferably 0.15 or more, and still more preferably 0.2 or more. In addition, the upper limit of $\varepsilon a/\varepsilon b$ is preferably 0.95 or less, more preferably 0.7 or less, and still more preferably 0.5 or less.

The viscoelastic layer 200 is not particularly limited if it is a material generally used for the viscoelastic layer in the vibration damping material, but for example, a rubber material, an elastomer material, or the like may be used. Examples of the rubber material include butyl rubber, acrylic rubber, chloroprene rubber and the like. Examples of the elastomer material include olefin-based elastomers, isobutylene-based elastomers and the like. The constraining layer 100 and the viscoelastic layer 200 can be adhered to each other by the viscosity of the viscoelastic layer 200.

From the viewpoint of panel followability, the lower limit of the thickness of the viscoelastic layer 200 is, for example, preferably 0.5 mm or more, more preferably 1 mm or more, still more preferably 2 mm or more. In addition, from the viewpoint of mass efficiency, the upper limit of the thickness of the viscoelastic layer 200 is, for example, preferably 5 mm or less, more preferably 4 mm or less, still more preferably 3 mm or less, and most preferably 2 mm or less.

According to the first embodiment, the viscoelastic layer 200 is provided with a constraining layer 100 having a strain ratio $\varepsilon a/\varepsilon b$ satisfying the expression $0<\varepsilon a/\varepsilon b<1$. This can improve the vibration damping performance, can block noise transmitted mainly via vibration of an object, and can exhibit sufficient sound insulation performance.

Second Embodiment

Figure 2:
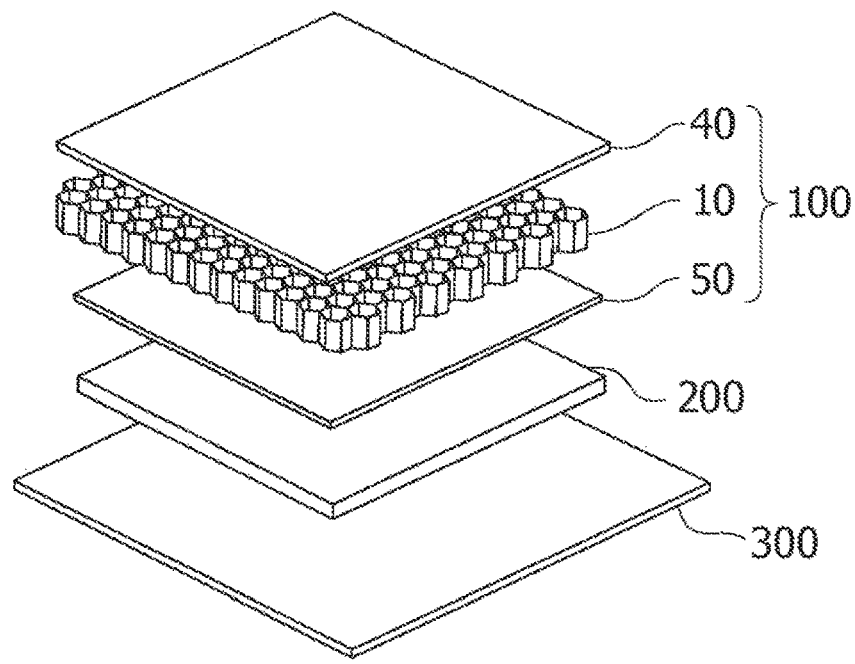
FIG. 2 is an exploded perspective view showing another embodiment of the vibration damping material according to the present invention.
Figure 3:
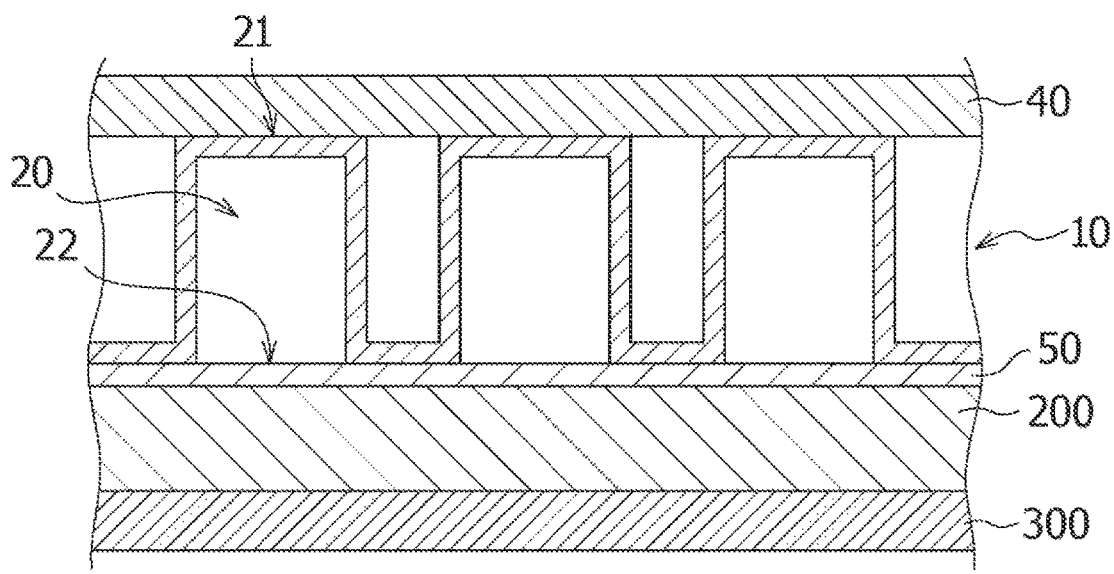
FIG. 3 is a schematic cross-sectional view of the embodiment of the vibration damping material shown in FIG. 2.

As shown in FIGS. 2 and 3, a vibration damping material of a second embodiment includes a core layer 10 having a hollow structure, a first film layer 40 provided on one surface of the core layer 10, a second film layer 50 provided on another surface of the core layer 10, and a viscoelastic layer 200 in contact with the second film layer 50. The multilayered structure of the core layer 10, and the first and second film layers 40 and 50 serves as a constraining layer 100 of the first embodiment described above. That is, the ratio $\varepsilon a/\varepsilon b$ satisfies an expression $0<\varepsilon a/\varepsilon b<1$, where: $\varepsilon a$ is the strain of the surface of the constraining layer 100 on the first film layer 40 side; and $\varepsilon b$ is the strain of the surface on the second film layer 50 side. Note that the same configurations as those in the first embodiment are referred to by the same reference signs, and detailed descriptions thereof are omitted here.

The core layer 10 is not particularly limited if it is a core layer generally used for a soundproofing material or a sound absorbing material, such as a core layer in which tubular cells are arranged in a plurality of rows. However, it is preferable to use a core layer having a structure as described below.

Figure 4:
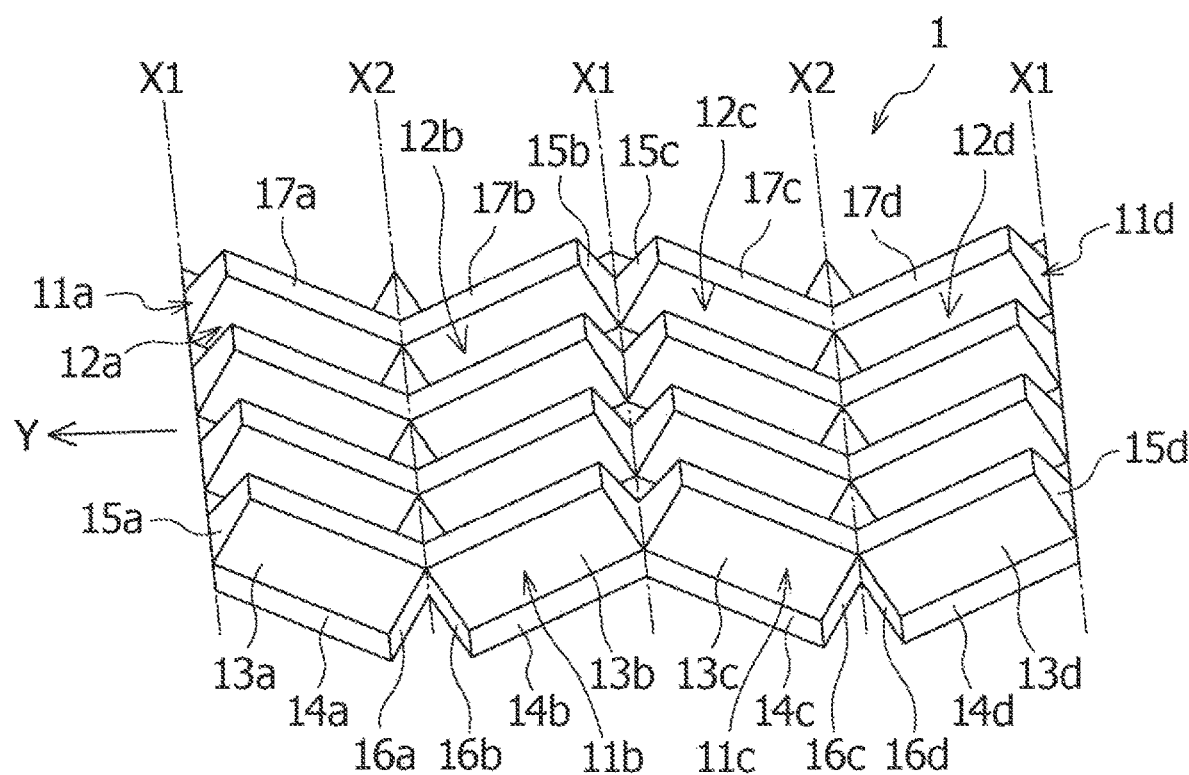
FIG. 4 is a perspective view showing a manufacturing process of a core material used for a core layer in a vibration damping material according to the present invention.

FIG. 4 is a perspective view showing a manufacturing process of a core material to be the core layer 10. Note that the manufacturing method of this core material is described in detail in WO 2006/053407 A, which is incorporated herein by reference.

As shown in FIG. 4, a flat material sheet is thermoformed by a roller (not shown) having a predetermined die to be plastically deformed substantially without cutting of the sheet, so that a core material 1 in the figure is formed. The materials of the core material 1 to be used can include, for example, a thermoplastic resin such as polypropylene (PP), polyethylene (PE), polyethylene terephthalate (PET), a composite material with fibers, paper, and metal, but it is not limited to these. In particular, a thermoplastic resin is preferable. In this embodiment, a case in which a thermoplastic resin is used is described below. The thickness of the material sheet is preferably in the range of 0.05 mm to 0.50 mm, for example, but it is not limited to this, and the thickness of the core material 1 after thermoforming is substantially the same.

The core material 1 has a three-dimensional structure in which ridge portions 11 and valley portions 12 are alternately arranged in a width direction X orthogonal to a manufacturing direction Y. The ridge portion 11 is configured with two side surfaces 13 and a top surface 17 between them, and the valley portion 12 is configured with two side surfaces 13 shared with the adjacent ridge portions 11 and a bottom surface 14 between them. Note that, in this embodiment, a case is described in which the shape of the ridge portion 11 is a trapezoid as shown in FIG. 4, but the present invention is not limited to this, and in addition to polygons such as triangles or rectangles, shapes may be curved shapes such as sine curves or bow shapes.

The core material 1 includes the three-dimensional structure continuously in the manufacturing direction Y. That is, as shown in FIG. 4, a plurality of ridge portions 11a, 11b, 11c, and 11d are continuously formed in the manufacturing direction Y. The valley portions 12 are also formed continuously. The connection between the ridge portions 11 and the connection between the valley portions 12 are made by alternately repeating two types of connection methods.

The first connection method is such that, as shown in FIG. 4, on a first folding line X1 in the width direction, top surfaces 17b and 17c of two adjacent ridge portions 11b and 11c are connected, via trapezoidal-shaped ridge portion connecting surfaces 15b and 15c, respectively. The ridge portion connecting surface 15 is formed at a right angle to the top surface 17. On the first folding line X1 in the width direction, bottom surfaces 14b and 14c of two adjacent valley portions are directly connected. The second connection method is such that, as shown in FIG. 4, on a second folding line X2 in the width direction, bottom surfaces 14a and 14b (or 14c and 14d) of two adjacent valley portions are connected, via trapezoidal-shaped valley portion connecting surfaces 16a and 16b (or 16c and 16d), respectively. A valley portion connecting surface 16 is formed at a right angle to the bottom surface 14. On the second folding line X2 in the width direction, top surfaces 12a and 12b (or 12c and 12d) of two adjacent ridge portions are directly connected.

Thus, the core material 1 has a plurality of three-dimensional structures (the ridge portions 11 and the valley portions 12) connected via the connection regions (the ridge portion connecting surfaces 15 and the valley portion connecting surfaces 16), and has the connection region folded to form a core layer of the vibration damping material of the present invention. Specifically, the core material 1 is mountain-folded along the first folding line X1 such that the bottom surfaces 14b and 14c of two adjacent valley portions contact back-to-back with each other, and the angle formed by the ridge portion connecting surfaces 15b and 15c of two adjacent ridge portions increases to 180 degrees. In addition, the core material 1 is valley-folded along the second folding line X2 such that top surfaces 17a and 17b (or 17c and 17d) of two adjacent ridge portions contact face to face with each other, and the angle between the valley portion connecting surfaces 16a and 16b (or 16c and 16d) of two adjacent valley portions decreases to 180 degrees. A core layer 10 of the vibration damping material of the present invention obtained by folding the core material 1 in this manner is shown in FIGS. 5 and 6.

Figure 5:
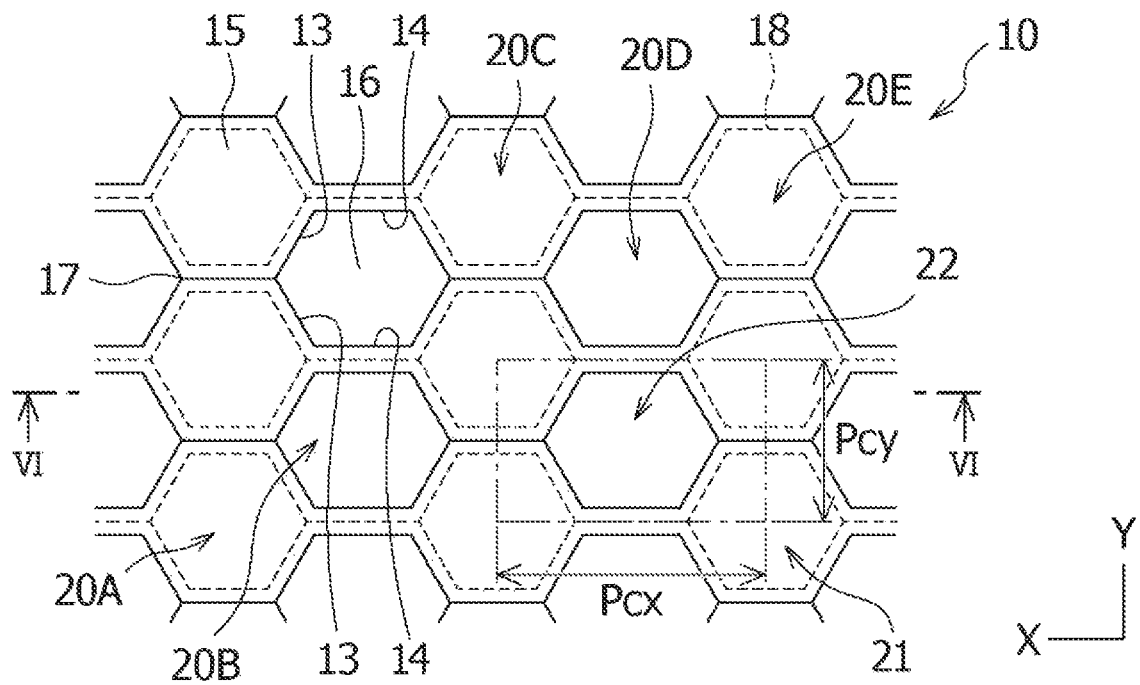
FIG. 5 is a schematic plan view showing a core layer in a vibration damping material according to the present invention.
Figure 6:
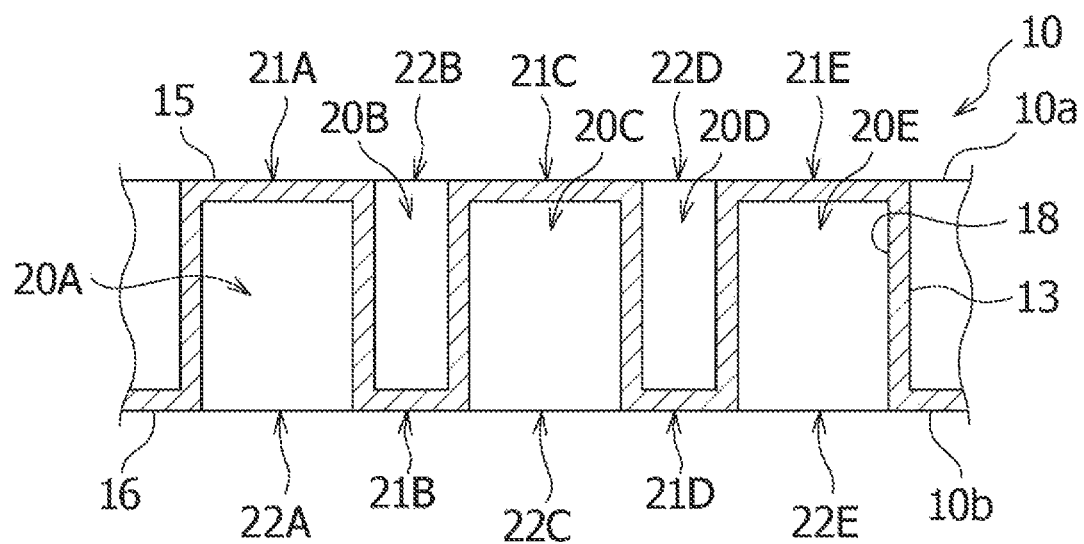
FIG. 6 is a schematic cross-sectional view showing the core layer of FIG. 5 along line VI-VI.

As shown in FIGS. 5 and 6, the core layer 10 includes substantially hexagonal tubular cells 20 arranged in a plurality of rows, and has cells 20A, 20C and 20E formed out of two adjacent ridge portions and cells 20B and 20D formed out of two adjacent valley portions, each arranged in every other row. A broken line 18 in FIG. 6 is the surface that has been the back surface of the core material, and generally indicates the inner wall of the cell 20 having the substantially hexagonal tubular shape.

The cells 20A, 20C, and 20E formed from the ridge portions each include six cell side walls forming the substantially hexagonal tubular shape. These cell side walls are formed out of the two top surfaces 17 and the four side surfaces 13 of the cell material. Furthermore, these cells 20A, 20C, and 20E include substantially hexagonal tubular-shaped closed surfaces 21A, 21C, and 21E, respectively, to close the cell ends at the cell ends on one surface 10a (front surface in FIG. 5) of the core layer 10. Each of these closed surfaces 21 on one side is formed out of two trapezoidal ridge portion connecting surfaces 15 in the cell material. Furthermore, these cells 20A, 20C, and 20E include open ends 22A, 22C, and 22E that are opened in the substantially hexagonal shape at the cell ends on the other surface 10b which is at the opposite side of the core layer 10. The open ends 22A, 22C, and 22E allow the respective internal spaces of the cells 20A, 20C, and 20E to be in communication with the outside.

The cells 20B and 20D formed from the valley portions each also includes six cell side walls forming the substantially hexagonal tubular shape. These cell side walls are formed from two bottom surfaces 14 and four side surfaces 13 of the cell material. Furthermore, these cells 20B and 20D include open ends 22B and 22D that are opened in the substantially hexagonal shape at the cell ends on the one surface 10a of the core layer 10. The open ends 22B and 22D allow the respective internal spaces of the cells 20B and 20D to be in communication with the outside. Furthermore, these cells 20B and 20D include substantially hexagonal tubular-shaped closed surfaces 21B and 21D that close the cell ends, respectively, at the cell ends on the other surface 10b, which is at the opposite side of the core layer 10. Each of these closed surfaces 21 on the other side is formed out of the two trapezoidal valley portion connecting surfaces 16 in the cell material.

In this way, the core layer 10 has the one-side closed surfaces 21A, 21C, and 21E formed out of the ridge portions of the cell material in every other row at the cell end on one surface 10a, and has the other-side closed surfaces 21B and 21D formed out of valley portions of the cell material in the different cell rows from the above at the cell ends on the other surface 10b. However, unless otherwise stated, both the closed surface 21 on one side and the closed surface 21 on the other side perform substantially the same function.

The thickness of the entire core layer 10 varies depending on which component of the vehicle a vibration damping material is used for, so it is not limited to the following. However, from the viewpoint of sound absorption performance of the core layer 10 itself, and strength and weight of the core layer 10, it is preferably in the range of 3 mm to 50 mm, and is more preferably in the range of 5 mm to 30 mm.

The basis weight (weight per unit area) of the core layer 10 varies depending on which component of the vehicle the vibration damping material is used for, so it is not limited to the following. However, it is preferably in the range of 400 g/m$^2$ to 4,000 g/m$^2$, and is more preferably in the range of 500 g/m$^2$ to 3,000 g/m$^2$. As the thickness of the core layer 10 is greater and the basis weight is greater, the strength of the core layer 10 generally tends to be higher.

The basis weight of the core layer 10 can be adjusted by the type of material of the core layer 10, the thickness of the entire core layer 10 or the wall thickness of the cell 20 (thickness of the material sheet) as well as the pitches Pcx and Pcy between the cells 20 of the core layer 10 (distance between the central axes of the cells). In order to set the basis weight of the core layer 10 within the above range, for example, it is preferable that the pitch Pcy between the cells 20 be in the range of 2 mm to 20 mm in the direction in which the cells 20 are adjacent to each other to form a row, which is the core manufacturing direction Y, it is more preferable that the pitch Pcy be in the range of 3 mm to 15 mm, and it is still more preferable that the pitch Pcy be in the range of 4 mm to 10 mm.

When the core layer 10 is used as the constraining layer 100, the materials, thickness, Young's modulus, or the like of the first and second film layers 40 and 50 are changed so that the constraining layer 100 has a strain ratio $\varepsilon a/\varepsilon b$ satisfying the expression of $0<\varepsilon a/\varepsilon b<1$.

The material of the first and second film layers 40, and 50 to be used may be, for example, resin films such as polypropylene (PP), polyethylene (PE), polyethylene terephthalate (PET), and polyamide (PA), but it is not limited to these. For the first film layer 40 and the second film layer 50, the same material may be used or different materials may be used, so that the strain ratio $\varepsilon a/\varepsilon b$ satisfies the above expression.

The thicknesses of the first and second film layers 40 and 50 are not particularly limited, but for example, the lower limit thereof is preferably 0.03 mm or more, more preferably 0.04 mm or more, still more preferably 0.05 mm or more. In addition, the upper limit of the thickness is preferably 0.5 mm or less, more preferably 0.4 mm or less, and still more preferably 0.3 mm or less. The first film layer 40 and the second film layer 50 may have the same thickness or may have different thicknesses, so that the strain ratio $\varepsilon a/\varepsilon b$ satisfies the above expression.

The first and second film layers 40 and 50 may be adhered to the core layer 10 by heat-welding, or may be adhered thereto via an adhesive (not shown). The adhesive to be used is not particularly limited, but for example, it may be an epoxy-based or acrylic-based adhesive. In addition, the first and second film layers 40 and 50 each may have a three-layer structure including a central layer and two adhesive layers located on both side surfaces thereof. In this case, the material of the adhesive layer is a material having a melting point lower than the melting point of the material used for the central layer. For example, polyamide having a melting point of 190° C. to 220° C. is used for the central layer, and polyethylene having a melting point of 90° C. to 130° C. is used for the adhesive layer. Then, the temperature at the time of heating when the first and second film layers 40 and 50 are adhered to the core layer 10 or the viscoelastic layer 200, and the temperature for thermoforming into a predetermined shape of the vibration damping material are set to about 150° C. to 160° C. This configuration and process melts only the adhesive layer without melting the central layer to enable the central layer to firmly adhere to the core layer 10. A resin having a melting point higher than that of polyethylene for the adhesive layer is polypropylene as well as polyamide.

The first and second film layers 40 and 50 each may be breathable with a plurality of apertures penetrating the film layer, or each may be non-breathable without such apertures. Providing the apertures can increase the strain E of the surface on the film layer side having the apertures provided, and can readily control the strain ratio $\varepsilon a/\varepsilon b$ described above. When there are apertures, the holes are provided in advance before the first film layer 40 or the second film layer 50 is adhered to the core layer 10, for example, by a hot needle or punching (punching using a male die and a female die). In order to prevent the holes from being closed, it is preferable to have a hole shape in which burrs of the holes are minimized. The aperture pattern does not have any particular limitation, but it is preferably arranged in a staggered arrangement or a lattice arrangement. The aperture rate of the first film layer 40, or the second film layer 50 is not particularly limited, but it is preferably in the range of 0.2% to 5%. The diameter of the aperture is preferably in the range of 0.25 mm to 2.5 mm, and more preferably in the range of 0.3 mm to 2.0 mm Note that the pitch of the apertures of the first film layer 40 or the second film layer 50 does not necessarily need to be the same as the pitches Pcx and Pcy of the cells 20 of the core layer 10 shown in FIG. 5, and the apertures and the cells 20 do not necessarily need to be aligned when the first film layer 40, or the second film layer 50 is adhered to the core layer 10. This is because the positions of the apertures of the first film layer 40 or the second film layer 50, and the open ends 22 of the cells 20 of the core layer 10 randomly overlap each other to allow appropriate communication between the inside and outside. It is preferable that the pitch of the apertures of the first film layer 40 or the second film layer 50 be smaller than the pitch of the cells 20 of the core layer 10, at least in either an X direction or a Y direction.

According to the second embodiment, the constraining layer 100 is configured such that the first and second film layers 40 and 50 are provided on both sides of the core layer 10 on which the open ends and the closed surfaces are arranged in every other row. This makes it possible to provide a vibration damping material which can obtain the same effect as that of the first embodiment and can achieve weight reduction together with high rigidity.

Third Embodiment

In the first and second embodiments, cases are described in which the surface of the viscoelastic layer 200 in contact with the constraining layer 100 has the same area as the surface of the constraining layer 100 on the viscoelastic layer 200 side, but the present invention is not limited to this. As shown in each example of FIGS. 7A to 7C, a vibration damping material of a third embodiment has a viscoelastic layer 200 partially provided on the surface 100b of the constraining layer 100 on the side in contact with the viscoelastic layer. Note that the same configurations as those in the first and second embodiments are referred to by the same reference signs, and detailed descriptions thereof are omitted here.

Figure 7A:
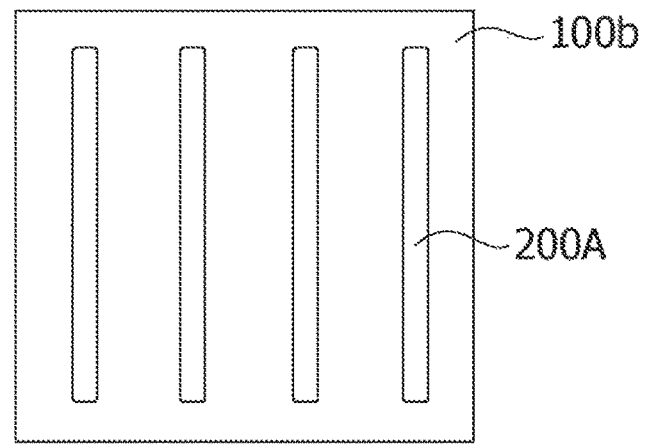
FIGS. 7A to 7C are back side views showing various embodiments of the vibration damping material according to the present invention.
Figure 7B:
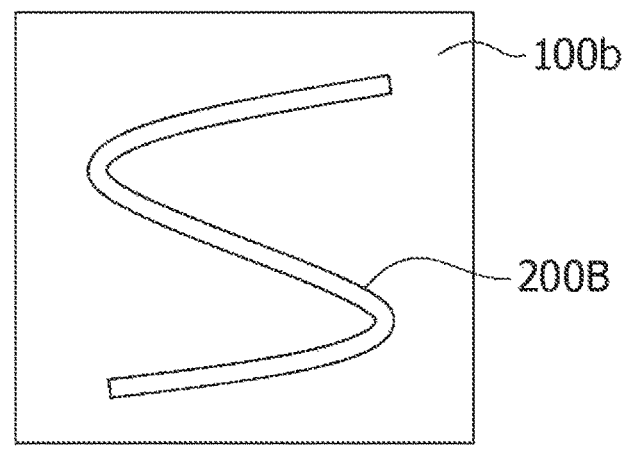
Figure 7C:
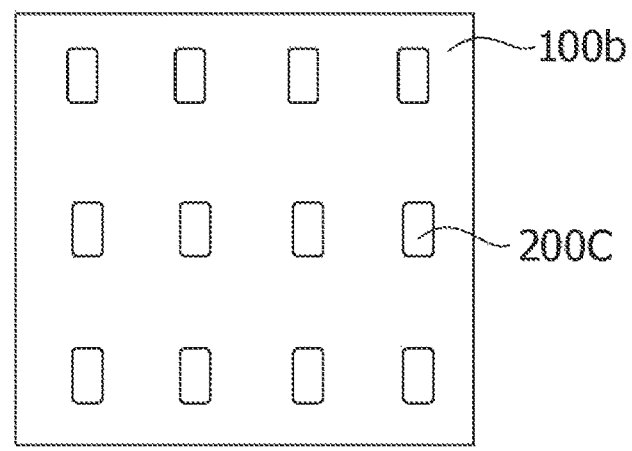

For example, as shown in FIG. 7A, a plurality of linear viscoelastic layers 200A may be arranged in parallel on the surface 100b of the constraining layer 100 on the side in contact with the viscoelastic layer. In addition, as shown in FIG. 7B, a curved viscoelastic layer 200B having an S-shape or the like may be provided on the surface 100b of the constraining layer 100 on the side in contact with the viscoelastic layer. Furthermore, as shown in FIG. 7C, a plurality of rectangular viscoelastic layers 200C may be arranged in a lattice pattern or in a staggered pattern, on the surface 100b of the constraining layer 100 on the side in contact with the viscoelastic layer. In this way, for example, the area of the surface of the viscoelastic layer 200 in contact with the constraining layer 100 is preferably in the range of 5% to 50% of the area of the surface of the constraining layer 100 on the viscoelastic layer 200 side, and more preferably in the range of 10% to 20%.

According to the third embodiment, the viscoelastic layer 200 is partially provided on the surface 100b of the constraining layer 100 on the side in contact with the viscoelastic layer. This makes it possible to obtain the same effect as that of the first and second embodiments while the amount of the viscoelastic layer 200 to be used is reduced.

Fourth Embodiment

Figure 8:
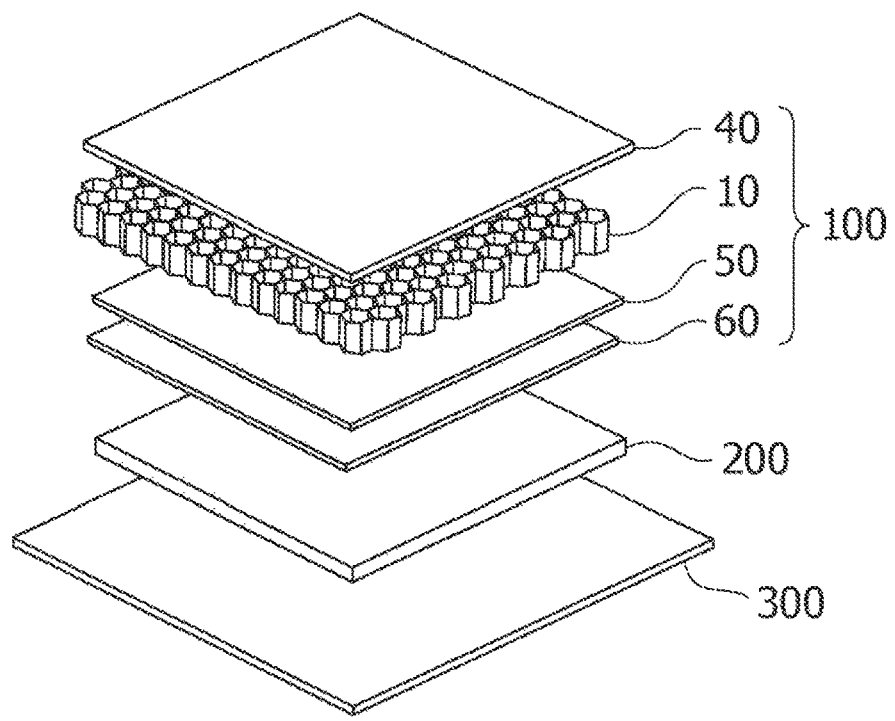
FIG. 8 is an exploded perspective view showing another embodiment of the vibration damping material according to the present invention.
Figure 9:
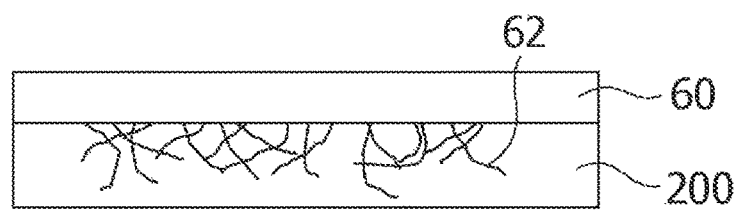
FIG. 9 is a schematic view showing an enlarged partial cross section of the embodiment of the vibration damping material shown in FIG. 8.

As shown in FIGS. 8 and 9, a vibration damping material of a fourth embodiment includes a core layer 10, a first film layer 40 provided on one surface of the core layer 10, a second film layer 50 and a fiber layer 60 provided in order on the other surface of the core layer 10, and a viscoelastic layer 200 in contact with the fiber layer 60. The multilayered structure of the core layer 10, the first and second film layers 40 and 50, and the fiber layer 60 serves as a constraining layer 100 of the first embodiment described above. That is, the ratio εa/εb satisfies the expression 0<εa/εb<1, where: εa is the strain on the surface of the constraining layer 100 on the first film layer 40 side; and εb is the strain on the surface on the fiber layer 60 side. Note that the same configurations as those in the first to third embodiments are referred to by the same reference signs, and detailed descriptions thereof are omitted here.

In the fourth embodiment, the fiber layer 60 is provided between the second film layer 50 and the viscoelastic layer 200. The fiber layer 60 is not particularly limited if it maintains the strain ratio εa/εb described above within a predetermined range. However, for example, it is preferable to use various nonwoven fabrics such as spunbonded, spunlaced, or needle punched nonwoven fabrics, using resin fibers such as polyethylene terephthalate (PET), polypropylene (PP), or polyethylene (PE). The basis weight of the fiber layer 60 is not particularly limited if the strain ratio εa/εb described above is maintained within a predetermined range. However, for example, it is preferably in the range of 10 g/m$^2$ to 600 g/m$^2$, more preferably in the range of 20 g/m$^2$ to 500 g/m$^2$, and still more preferably in the range of 30 g/m$^2$ to 300 g/m$^2$.

The fiber layer 60 and the second film layer 50 can be adhered to each other by utilizing the heat-welding property of the second film layer 50 or by using an adhesive. The fiber layer 60 and the viscoelastic layer 200 can be adhered to each other by utilizing the viscosity of the viscoelastic layer 200.

According to the fourth embodiment, the constraining layer 100 is provided so that the fiber layer 60 is in contact with the viscoelastic layer 200. This enables obtaining the same effect as that of the first embodiment, and as shown in FIG. 9, sinks fibers 62 in the fiber layer 60 of the constraining layer 100 into the inside of the viscoelastic layer 200 to adhere the fibers 62 thereto. This configuration such that the fibers are mixed in the viscoelastic layer 200 enables obtaining an effect such that the vibration damping effect is improved and the adhesive strength between the constraining layer 100 and the viscoelastic layer 200 is also improved.

Fifth Embodiment

Figure 13:
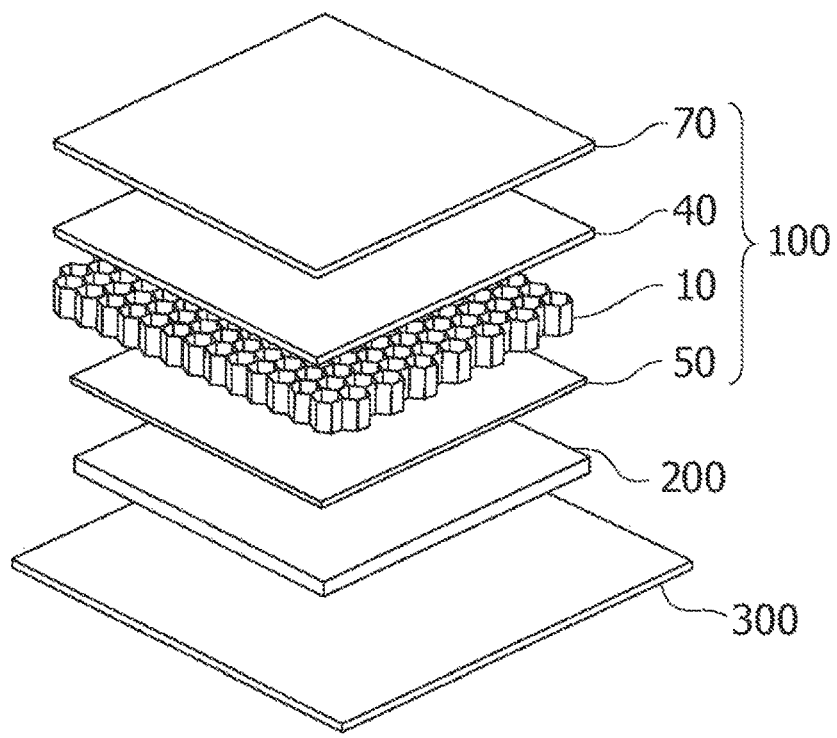
FIG. 13 is an exploded perspective view showing still another embodiment of the vibration damping material according to the present invention.

As shown in FIG. 13, a vibration damping material of a fifth embodiment includes a core layer 10, a first film layer 40 and a metal layer 70 provided in order on one surface of the core layer 10, a second film layer 50 provided on the other surface of the core layer 10, and a viscoelastic layer 200 in contact with the second film layer 50. The multilayered structure of the core layer 10, the first and second film layers 40 and 50, and the metal layer 70 serves as a constraining layer 100 of the first embodiment described above. That is, the ratio εa/εb satisfies the expression 0<εa/εb<1, where: εa is the strain on the surface of the constraining layer 100 on the metal layer 70 side; and εb is the strain on the surface on the second film layer 50 side. Note that the same configurations as those in the first to third embodiments are referred to by the same reference signs, and detailed descriptions thereof are omitted here.

In the fifth embodiment, the metal layer 70 is provided on the outer surface side of the first film layer 40. The metal layer 70 is not particularly limited if it maintains the strain ratio εa/εb described above within a predetermined range, but for example, it is preferable to use a metal thin film such as a steel plate, an aluminum foil, or a copper foil. The thickness of the metal layer 70 is not particularly limited if the strain ratio εa/εb described above is maintained within a predetermined range, but for example, the lower limit is preferably 5 μm or more, more preferably 7 μm or more, and still more preferably 10 μm or more. Furthermore, the upper limit is preferably 1 mm or less, more preferably 0.5 mm or less, still more preferably 0.1 mm or less. The metal layer 70 and the first film layer 40 can be adhered to each other by utilizing the heat-welding property of the first film layer 40 or by using an adhesive.

According to the fifth embodiment, the metal layer 70 is provided on the surface of the constraining layer 100 opposite to the viscoelastic layer 200. This makes it possible to obtain the same effect as that of the first embodiment, and to significantly reduce the strain εa on the surface of the constraining layer 100 on the opposite side to the viscoelastic layer 200 to facilitate control of the strain ratio εa/εb.

Sixth Embodiment

Figure 14A:
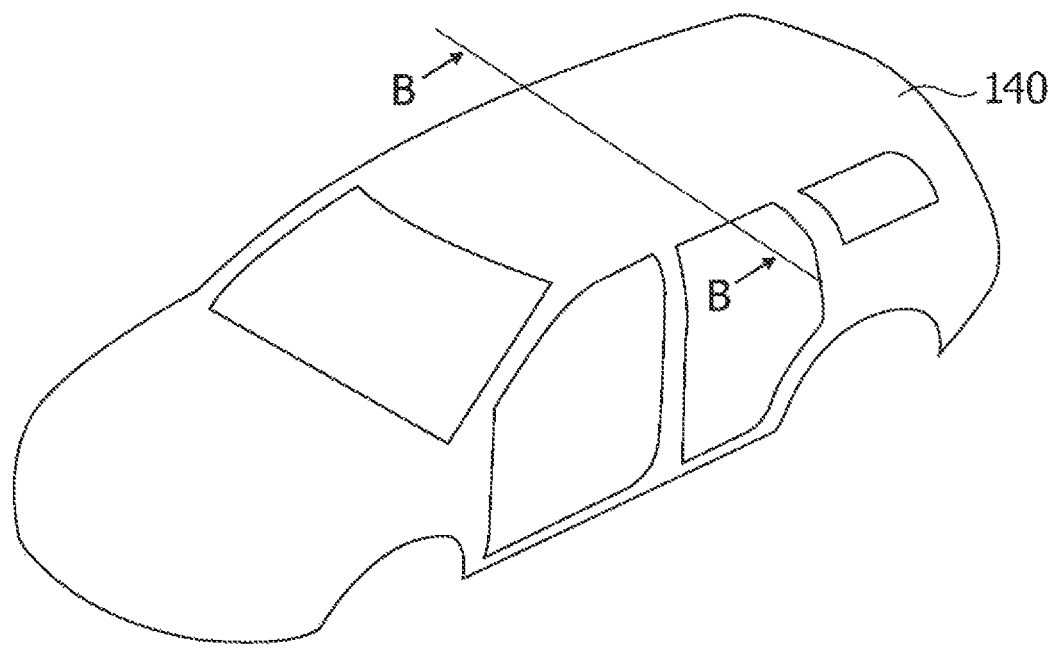
FIG. 14A is a perspective view schematically showing a vehicle body.

As shown in FIG. 14, a vibration damping material of a sixth embodiment has a structure such that a constraining layer 100R is molded to match the shape of a panel 300R of the roof of a vehicle so that the thickness of a viscoelastic layer 200R is uniform. Note that the same configurations as those in the first embodiment are referred to by the same reference signs, and detailed descriptions thereof are omitted here.

Figure 14B:
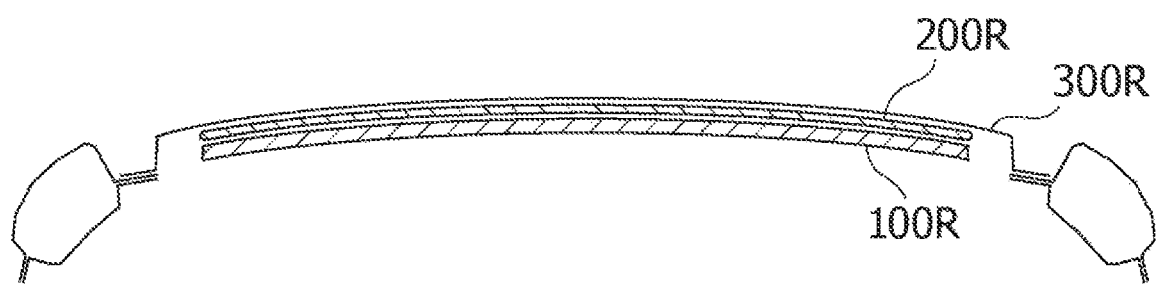
FIG. 14B is a cross-sectional view taken along line B-B schematically showing an example of a state in which there is installed a vibration damping material, which is molded to match the shape of a vehicle body panel shown in FIG. 14A, according to the present invention.

In the case of the vibration damping material molded in this way, as shown in FIG. 14B, the strain ratio εa/εb described above satisfies the expression 0<εa/εb<1, where: εa is the strain on the surface of the constraining layer 100R after molding on the side opposite to the viscoelastic layer 200R; and εb is the strain on the surface thereof on the side in contact with the viscoelastic layer 200R.

According to the sixth embodiment, the constraining layer 100R of the vibration damping material has a shape such as a curved shape or a corrugated shape corresponding to the shape of the panel 300R, instead of a flat shape. However, if the thickness of the viscoelastic layer 200R is uniform, the constraining layer 100R having a strain ratio εa/εb satisfying the above expression can improve the vibration damping performance as in the first embodiment, can block noise transmitted mainly via vibration of an object, and can exhibit sufficient sound insulation performance. Note that, although FIG. 14 shows a vibration damping material provided on the roof panel of a vehicle, the present invention is not limited to this, and the same effect also can be obtained on panels having various shapes, which are not flat, such as dash panels, floor panels, and door panels of vehicles.

EXAMPLES

Examples and a Comparative Example of the present invention are described below.

Figure 10:
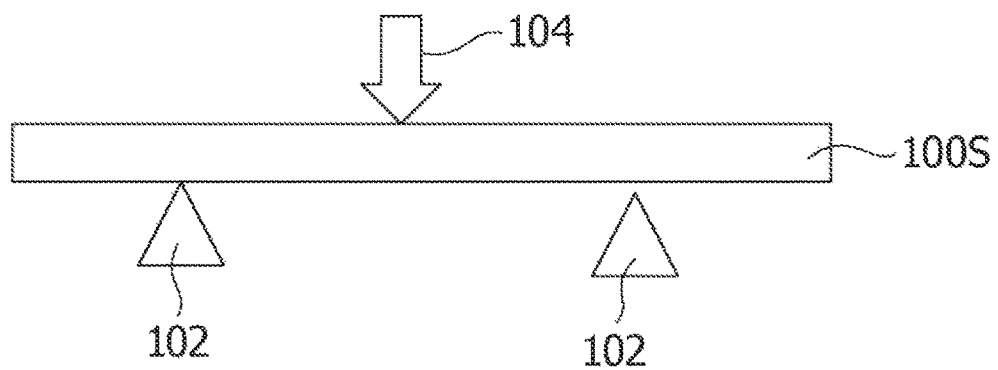
FIG. 10 is a schematic view illustrating a method for measuring a strain of a vibration damping material according to the present invention.

As Example 1, a vibration damping material including the constraining layer and the viscoelastic layer shown in FIG. 2 was produced. First, to produce a constraining layer, the first film layer (material: polypropylene (PP) film, thickness: 350 μm) was adhered to one surface of the core layer having the structures shown in FIGS. 5 and 6 (material: polypropylene (PP) resin, pitch between cells Pcy: 8 mm, core layer thickness: 10 mm), and the second film layer (material:

polypropylene (PP) film, thickness: 300 μm) was adhered to the other surface. Then, this constraining layer was subjected to three-point bending using a universal material testing machine (model 5900, manufactured by Instron), and the strain was measured. The size of the test piece was 60 mm×200 mm. As shown in FIG. 10, a test piece 100S was supported by two fulcrums 102 located at an interval of 100 mm, and a load was applied to the center position thereof with an indenter 104 so that the indenter 104 moved down by 0.5 mm. For strain measurement, a strain measuring instrument (PCD-400A, manufactured by Kyowa Electronic Instruments Co., Ltd.) was used. Each of the strains εa and εb on both sides of the constraining layer was measured. As a result, the strain ratio εa/εb was 0.91.

Figure 11A:
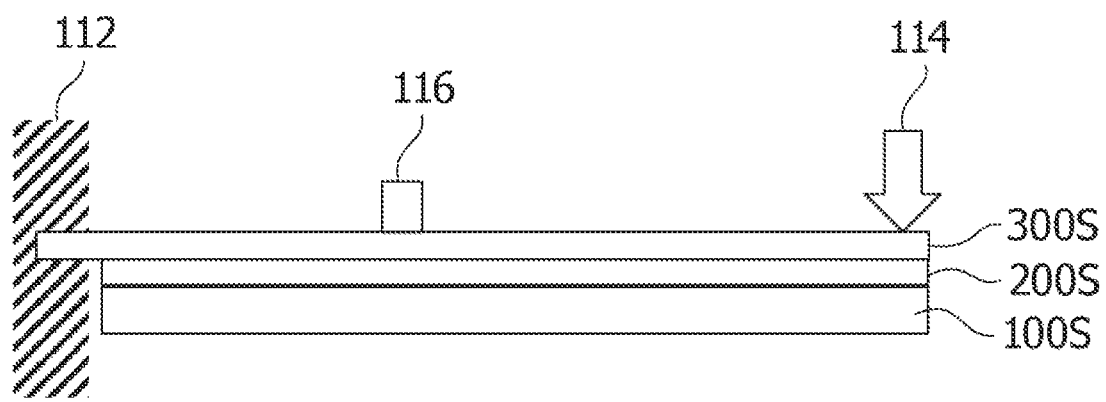
FIG. 11A is a schematic diagram illustrating a method for measuring a loss coefficient of a vibration damping material according to the present invention.
Figure 11B:
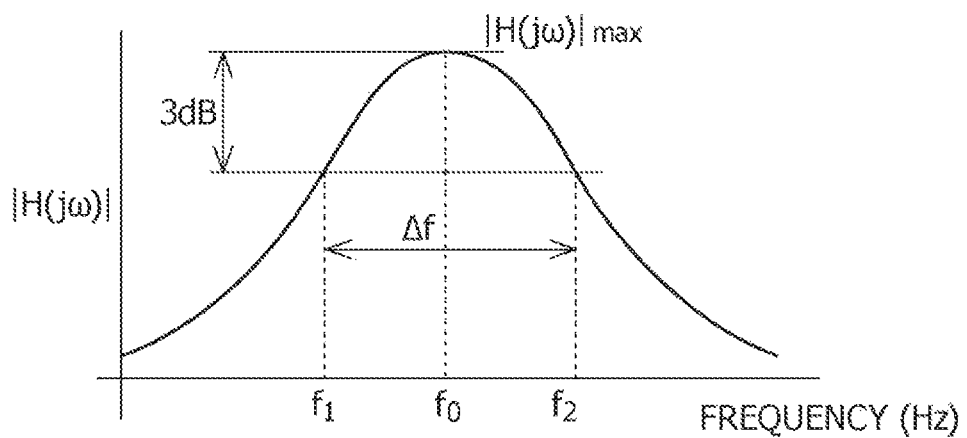
FIG. 11B is a graph for determining a loss coefficient from measured values.

Next, a viscoelastic layer (material: butyl rubber, thickness: 1 mm sheet) was adhered to the second film layer side of the constraining layer to produce a vibration damping material. Furthermore, a panel (material: steel plate, thickness: 0.5 mm) was adhered to the viscoelastic layer side of this vibration damping material. Then, the loss coefficient was measured with the vibration damping material adhered to this panel. As the test piece, as shown in FIG. 11A, the constraining layer 100S and the viscoelastic layer 200S each had a size of 60 mm×180 mm, and a panel 300S had a size of 60 mm×200 mm. The protruding, 20 mm length portion of the panel was fixed to a fixing device 112 to support the test piece on one side. Then, the FFT analyzer 116 (DS-3200, manufactured by Ono Sokki Co., Ltd.) was placed on the panel 300S of the test piece 40 mm away from the fixing device 112, and the free end side of the test piece was loaded with a hand-held electromagnetic exciter 114 (Type 5961, manufactured by B & K Co., Ltd. The loss coefficient was calculated from the obtained measurement results of the resonance characteristics by a half-value width method. As shown in FIG. 11B, a frequency graph with respect to the amplitude of the test piece is created. The loss coefficient was calculated from an expression of $\eta=(f_2-f_1)/f_0$, where: $f_0$ was the frequency at the maximum amplitude; and $f_1$ and $f_2$ were frequencies between which the amplitudes ranging over 3 dB from the maximum amplitude were contained. The result is shown in Table 1 and FIG. 12.

Note that a vibration damping material in Comparative Example 1 for comparison was produced in the same manner as in Example 1 except that only a PP film (thickness: 300 μm) was used as the constraining layer. In Comparative Example 1, the strain and the loss coefficient were measured in the same manner as in Example 1. The result is shown in Table 1 and FIG. 12.

In addition, vibration damping materials in Examples 2 to 6, as shown in Table 1, were produced in the same manner as in Example 1, except that the film layers had different thicknesses on the viscoelastic layer side and the opposite side, of the constraining layer, and some film layers further had a metal layer (material: steel plate, thickness: 0.5 mm; or material: aluminum foil, thickness: 30 μm) provided thereon. Then, the strains and loss coefficients were measured in Examples 2 to 6. These results are shown in Table 1 and FIG. 12.

TABLE 1

| | Panel material & thickness | Viscoelastic layer thickness | Constraining layer | | | | | Loss coefficient |
|---|---|---|---|---|---|---|---|---|
| | | | Core layer | | Layer on viscoelastic layer side | Layer on opposite side | εa/εb | η |
| | | | Pitch | Thickness | | | | |
| Example 1 | Steel plate 0.5 mm | 1 mm | 8 mm | 10 mm | PP Film 300 μm | PP film 350 μm | 0.91 | 0.16 |
| Example 2 | Steel plate 0.5 mm | 1 mm | 8 mm | 10 mm | PP Film 150 μm | PP film 300 μm | 0.70 | 0.17 |
| Example 3 | Steel plate 0.5 mm | 1 mm | 8 mm | 10 mm | PP Film 50 μm | PP film 300 μm | 0.67 | 0.19 |
| Example 4 | Steel plate 0.5 mm | 1 mm | 8 mm | 10 mm | PP Film 50 μm | PP film 900 μm | 0.61 | 0.21 |
| Example 5 | Steel plate 0.5 mm | 1 mm | 8 mm | 10 mm | PP Film 50 μm | PP film 300 μm + Steel plate 0.5 mm | 0.13 | 0.45 |
| Example 6 | Steel plate 0.5 mm | 1 mm | 8 mm | 10 mm | PP Film 50 μm | PP film 300 μm + Al foil 30 μm | 0.21 | 0.34 |
| Comparative Example 1 | Steel plate 0.5 mm | 1 mm | None | | PP Film 300 μm | None | 1 | 0.08 |

Figure 12:
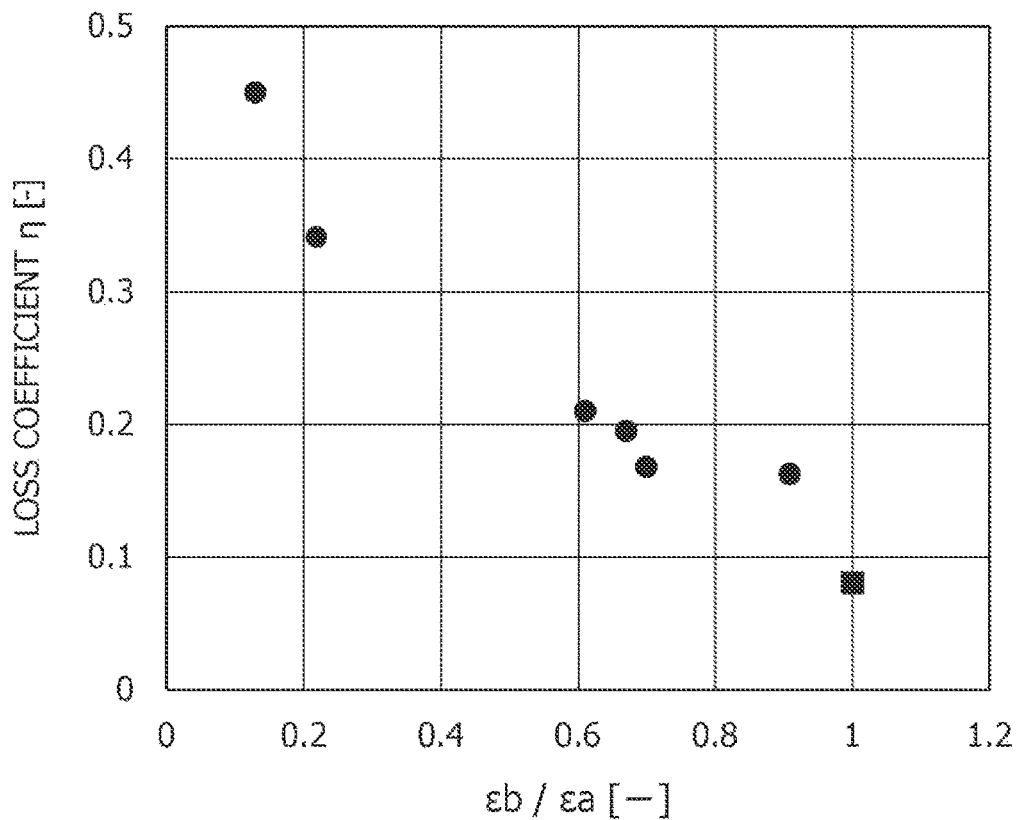
FIG. 12 is a graph showing measurement results of loss coefficient in Examples and Comparative Example of the vibration damping material according to the present invention.

As shown in Table 1 and FIG. 12, the vibration damping materials in Examples 1 to 6 had the strain ratio εa/εb smaller than 1, where: εa was the strain on the surface of the constraining layer on the opposite side to the viscoelastic layer; and εb was the strain on the surface thereof on the side in contact with the viscoelastic layer, and the vibration damping materials in Examples 1 to 6 improved loss coefficients significantly as compared with that in Comparative Example 1 having a strain ratio εa/εb of 1.

INDUSTRIAL APPLICABILITY

According to the vibration damping material of the present invention can achieve high rigidity and weight reduction while exhibiting excellent vibration damping performance (sound insulation performance). Therefore, the vibration damping material of the present invention is specifically useful for, for example, a component that attenuates panel vibration between a vehicle interior and a noise source such as a dash panel, floor panel, door panel, roof, wheel house, and fender panels.

REFERENCE SYMBOL LIST

1 Core material
10 Core layer

11 Ridge portion
12 Valley portion
13 Side surface portion
14 Bottom surface portion
15 Ridge portion connecting surface
16 Valley portion connecting surface
17 Top surface
18 Back surface of core material
20 Cell
21 Closed surface
22 Open end
40 First film layer
50 Second film layer
60 Fiber layer
70 Metal layer
100 Constraining layer
200 Viscoelastic layer
300 Panel

The invention claimed is:

1. A vibration damping material comprising:
a viscoelastic layer; and
a constraining layer provided on one surface of the viscoelastic layer,
wherein a relationship between a strain εa and a strain εb is 0<εa/εb<1, the strain εa being a strain on a surface of the constraining layer on the opposite side to the viscoelastic layer, and the strain εb being a strain on a surface of the constraining layer on a side in contact with the viscoelastic layer,
wherein the constraining layer has a multilayer structure including at least a core layer in which tubular cells are arranged in a plurality of rows,
wherein each of the cells in the core layer has a closed surface at one end and an open end at another end, the open ends of the cells each allow an internal space of the cell to be in communication with an outside, and
the open ends of the cells are arranged on both sides of the core layer such that rows of the open ends of the cells are in every other row.

2. The vibration damping material according to claim 1, wherein the viscoelastic layer has a thickness of 0.5 to 2 mm.

3. The vibration damping material according to claim 1, wherein the constraining layer has a structure such that the constraining layer is formed to match a panel shape so that a thickness of the viscoelastic layer is uniform.

4. The vibration damping material according to claim 1, wherein the relationship between the strain εa and the strain εb is 0.2<εa/εb<0.7.

5. The vibration damping material according to claim 1, wherein the constraining layer further comprises film layers provided on both sides of the core layer, each of the film layers having a plurality of apertures penetrating the film layer.

6. The vibration damping material according to claim 1, wherein the viscoelastic layer is partially provided on a surface of the constraining layer on the side in contact with the viscoelastic layer.

7. The vibration damping material according to claim 1, wherein the constraining layer has a multilayer structure including a fiber layer on the constraining layer on the side in contact with the viscoelastic layer.

8. The vibration damping material according to claim 1, wherein the constraining layer has a multilayer structure including a metal layer on the constraining layer on a side opposite to the side in contact with the viscoelastic layer.

* * * * *